(12) United States Patent
Cornell

(10) Patent No.: US 9,120,044 B2
(45) Date of Patent: Sep. 1, 2015

(54) FUME EXTRACTION

(71) Applicant: BOFA International Limited, Poole, Dorset County (GB)

(72) Inventor: David Lawrence Cornell, Poole (GB)

(73) Assignee: Bofa International Limited, Poole (GB)

( * ) Notice: Subject to any disclaimer, the term of this patent is extended or adjusted under 35 U.S.C. 154(b) by 15 days.

(21) Appl. No.: 14/018,699

(22) Filed: Sep. 5, 2013

(65) Prior Publication Data

US 2015/0059583 A1    Mar. 5, 2015

(51) Int. Cl.
*B01D 46/46* (2006.01)
*B01D 46/44* (2006.01)
*B01D 46/00* (2006.01)

(52) U.S. Cl.
CPC .......... *B01D 46/446* (2013.01); *B01D 46/0068* (2013.01)

(58) Field of Classification Search
CPC ........ B01D 46/00; B01D 46/44; B01D 46/46; B01D 53/04
USPC ......... 55/350, 316, 387, 503, DIG. 34; 95/20, 95/25, 26, 273; 96/113, 131, 141, 417, 96/418, 421, 422
See application file for complete search history.

(56) References Cited

U.S. PATENT DOCUMENTS

| 3,782,083 | A | * | 1/1974 | Rosenberg | 55/491 |
| 4,308,840 | A | * | 1/1982 | Hiramatsu et al. | 123/519 |
| 4,388,086 | A | * | 6/1983 | Bauer et al. | 95/118 |
| 4,581,047 | A | * | 4/1986 | Larsson | 96/131 |
| 4,685,066 | A | | 8/1987 | Hafele et al. | |
| 4,717,401 | A | * | 1/1988 | Lupoli et al. | 96/141 |
| 4,859,220 | A | | 8/1989 | Leber et al. | |
| 5,239,861 | A | | 8/1993 | Fujita et al. | |
| 5,346,533 | A | * | 9/1994 | Jelich et al. | 95/20 |
| 5,348,572 | A | * | 9/1994 | Jelich et al. | 96/113 |
| 5,378,254 | A | * | 1/1995 | Maly et al. | 96/418 |
| 5,391,218 | A | * | 2/1995 | Jorgenson et al. | 95/20 |
| 5,484,536 | A | * | 1/1996 | Yamaguchi et al. | 210/741 |
| 5,711,785 | A | | 1/1998 | Maxwell | |
| 2002/0038545 | A1 | | 4/2002 | Sakaguchi | |

OTHER PUBLICATIONS

UK Intellectual Property Office, Search Report issued Dec. 17, 2012 in commonly owned GB1203514.4 filed Feb. 29, 2012; 1 page.
EPO Search Report issued May 17, 2013 in commonly owned EP13157235.6 filed Feb. 28, 2013; 5 pages.

* cited by examiner

*Primary Examiner* — Duane Smith
*Assistant Examiner* — Minh-Chau Pham
(74) *Attorney, Agent, or Firm* — Additon, Higgins & Pendleton, P.A.

(57) ABSTRACT

An operational monitoring apparatus for a fume extraction filter assembly having a pressure sensor assembly and a data processor. The pressure sensor assembly senses fluid pressure at an outlet to a downstream filter, fluid pressure from an inlet to an upstream filter, and fluid pressure from fluid flowing from an outlet of the upstream filter to the inlet of the downstream filter. The data processor processes fluid pressure difference values between the respective inlet and outlet of each filter.

12 Claims, 3 Drawing Sheets

FUME EXTRACTION

FIELD OF THE INVENTION

The invention relates generally to fume extraction, and in particular to filter assemblies for use in fume extraction.

BACKGROUND

In many industries such as electronics fabrication, laser marking/cutting/engraving and pharmaceuticals, extraction systems are used to capture hazardous particulate and gaseous/vaporised matter generated by industrial processes.

Known fume extraction systems comprise multiple graded particulate filters and a gas filter (typically activated carbon based) which are housed in a single unit, together with an extraction pump. The extraction pump draws contaminated air into the unit, through the filters to remove the contaminants and outputs filtered air to the working area.

When saturated, the filters, and in particular the gas filter, must be replaced. In environments where high rates of gas/vapours are generated, the filters will need to be replaced more often.

Applicants devised significant improvements in relation to fume extraction.

SUMMARY OF THE INVENTION

According to a first aspect of the invention there is provided an operational monitoring apparatus for a fume extraction filter assembly, the apparatus comprising a pressure sensor assembly, the pressure sensor assembly configured to be capable of sensing fluid pressure at an outlet to a downstream filter, fluid pressure from an inlet to an upstream filter, and fluid pressure from fluid flowing from an outlet of the upstream filter to the inlet of the downstream filter, the apparatus further comprising a data processor to process, a fluid pressure difference values between the respective inlet and outlet of each filter.

The data processor is configured to use a respective pressure difference value to determine a filter condition status for each filter. Preferably the filter condition status is indicative of the extent of saturation of the respective filter.

The pressure sensor assembly comprises a conduit to fluidically connect a region of fluid pressure to be measured to a respective pressure sensor.

The apparatus further comprises a flow measurement device configured to be capable of providing a measure of fluid flow rate exiting the filter assembly. The fluid flow rate is measured at or downstream of the fluid outlet of the downstream filter. The measure of said fluid flow rate is obtained using a Pitot tube device and a pressure sensor.

The data processor is arranged to issue a control signal to an extraction fan of the filter assembly, in response to the measure of the fluid flow rate exiting the filter assembly so as to substantially maintain a required/target flow rate. The control signal causes control of the speed of the extraction fan. In this arrangement, the signals from the fluid flow measurement device are used a feedback signal to control the speed of the fan.

The apparatus comprises a user interface which comprises a display to allow the user to view operational data derived from the pressure sensor assembly and/or the flow measurement device. The user interface comprises a user input which allows a user to set a required fluid flow rate.

According to a second aspect of the invention there is provided a fume extraction apparatus comprising the apparatus of the first aspect of the invention.

BRIEF DESCRIPTION OF THE DRAWINGS

The foregoing and other objects and advantages of the invention and the manner in which the same are accomplished will become clearer used on the following detailed description taken in conjunction with the accompanying drawings in which.

DETAILED DESCRIPTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

There is now described an operational monitoring apparatus for a fume extraction filter assembly which, as will be described in detail below, provides automatic flow control, flow reading and filter saturation status in relation to a fume extraction unit comprising a two-stage filter assembly. As will be described in more detail below, the apparatus includes pressure sensors which are used to measure a pressure drop across each filter.

Figure 1:
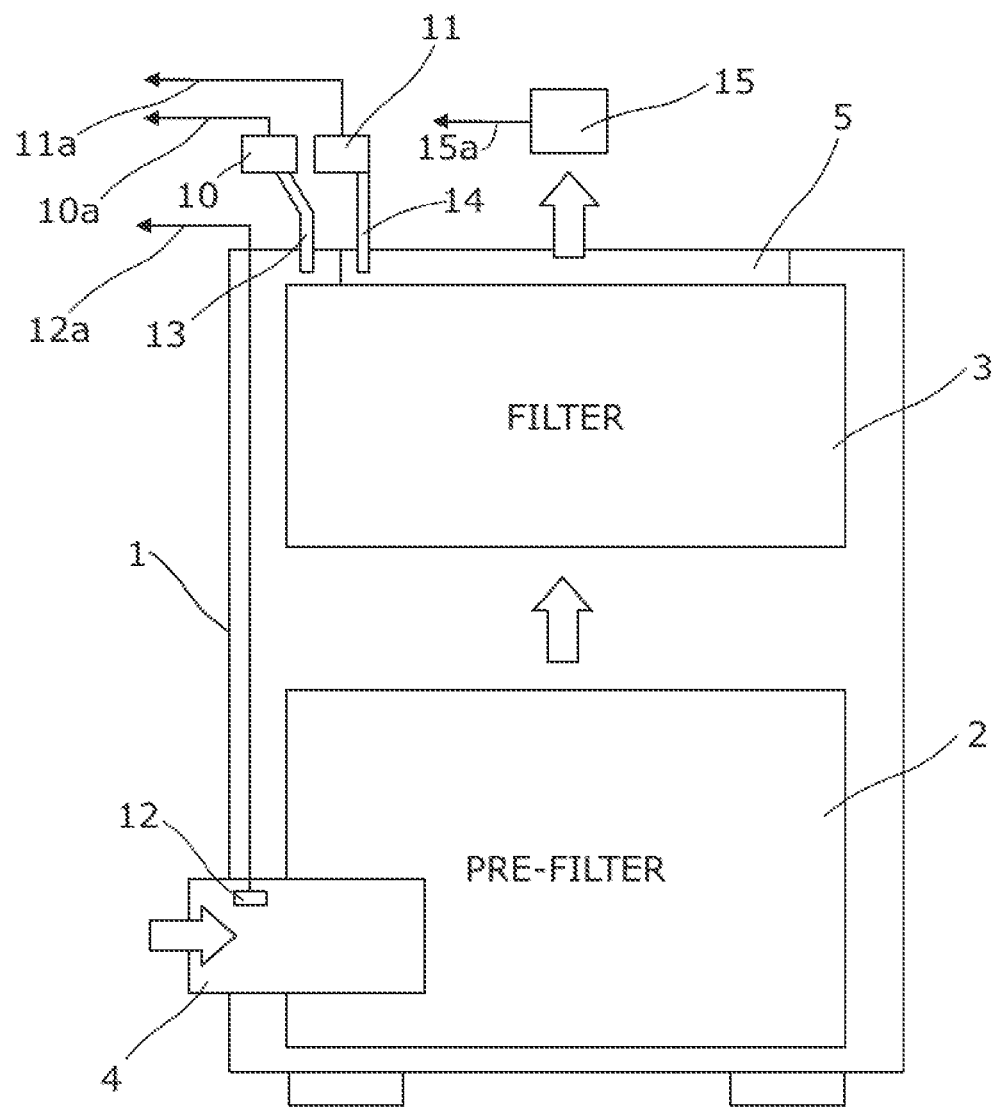
FIG. 1 is a schematic view of a fume extraction filter assembly.

With reference initially to FIG. 1, there is shown a fume extraction filter assembly comprising a housing 1, a (downstream) (pre-) filter 2 and a (upstream) filter 3, an inlet duct 4 and an outlet 5. In overview, contaminated air enters through the inlet duct 4 passes through the filter 2 and the filter 3, and exits at the outlet 5. The air is drawn through the assembly by an extraction fan (not illustrated) which is located downstream of the outlet 5.

The filter 2 comprises a filter medium which removes particles from the air prior to it reaching the filter 3. This ensures that the filter 3 is protected from particles (and in particular larger/heavier particles) reaching and causing damage thereto. The filter 3 comprises a High-Efficiency Particulate Air (HEPA) filter.

The filter assembly is provided with a pressure sensor assembly comprising a first pressure sensor 10, a pressure sensor 11 and a pressure sensor 12. Each of the sensors 10 and 11 is fluidically connected with two fluid flow regions of the filter assembly, by way of conduits 13 and 14. The sensor 10 is connected to air flowing from the filter 2 to the filter 3 by way of the conduit 13. The sensor 110 is fluidically connected to air exiting the filter 3 through the outlet 5. The pressure sensor 12 senses pressure of fluid flowing through the inlet 4, into the filter assembly. Each pressure sensor thus receives a respective, pressure inputs (on respective pressure sensitive surfaces) and is configured to output a signal (10a, 11a, and 12a respectively) indicative of the pressure value at a respective fluid flow region. The output signals are received by a data processor so, as to calculate pressure differences across each filter, which is discussed in more detail below.

The pressure sensor assembly further comprises a flow measurement device 15 which comprises a Pitot tube. The device 15 is positioned so as provide a measure of fluid flow rate of air exiting the filter 3, with the sensor located in the fluid flow stream leaving the filter 3. A signal 15a, indicative of the fluid flow rate, is output by the device 15.

The sensors 10 and 11 are housed in a space of the housing 1 which is separate from the volume of the housing 1 in which the filters are held. It is to be noted that the pressure sensor 12 is located within the volume of the inlet 4, and exposed to the flow of air therethrough. This positioning of the sensor 12 advantageously means that the sensor will detect whether there is a blockage within the inlet. If so, a user can be informed of this by way of an alarm signal (audio and/or visual) being activated.

Figure 2:
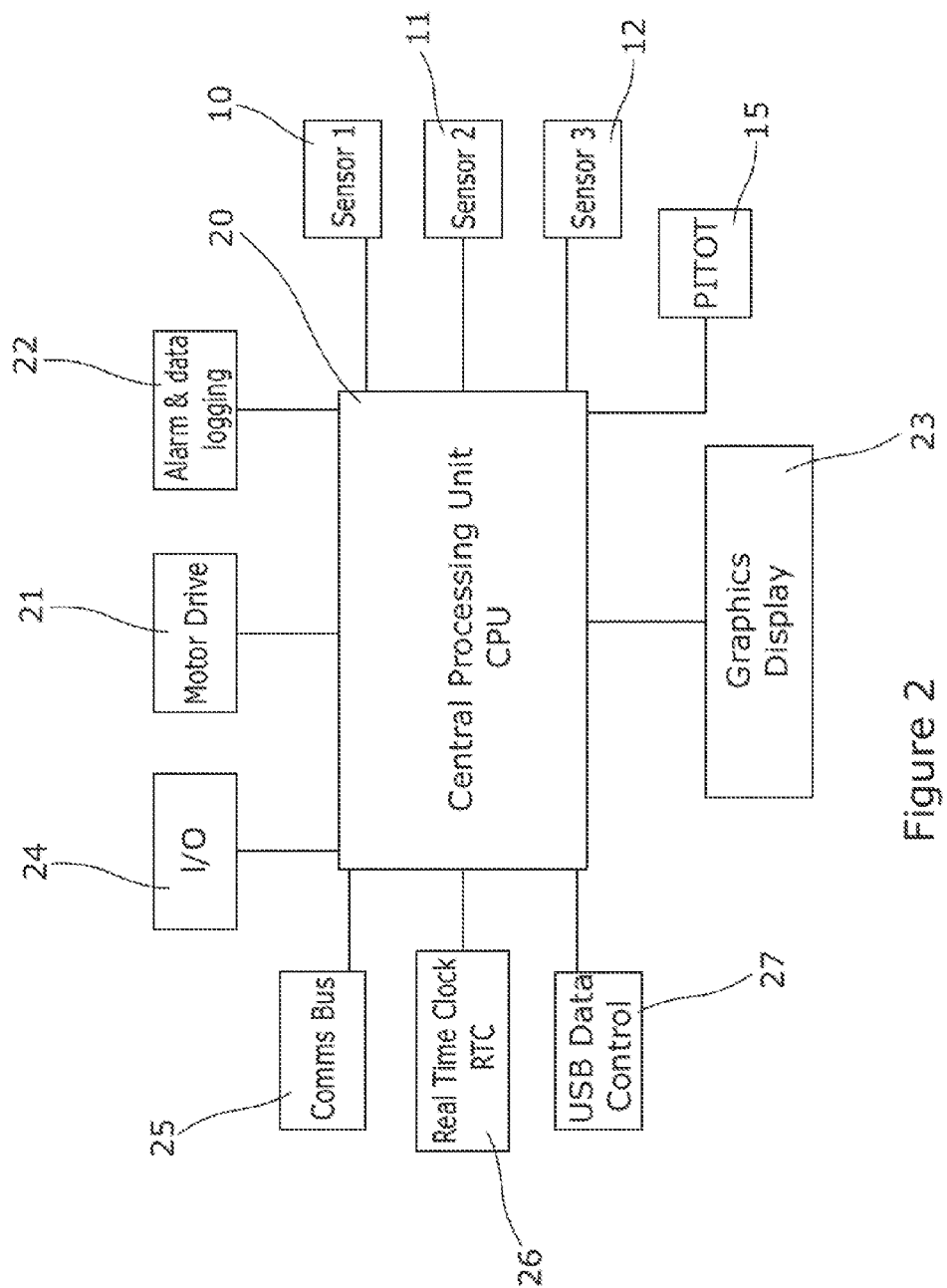
FIG. 2 is a block diagram of a data processor and various functional components connected to the data processor.

Reference is now made to FIG. 2 which shows a schematic representation of a data processor 20, and various functional components which are connected thereto. The sensors 10, 11 and 12, as discussed above, are shown connected to the processor as is the motor drive 21 of the extraction fan. Also connected to the data processor 20 is a memory 22, in the form of a rolling buffer, which stores details of alarms which have been raised and for data logging purposes. In this latter regard, the memory 22 stores a cache of analytical data enabling users to download performance and operating parameters for evaluation purposes. Data from the sensors is stored as time-stamped data which can then be used for diagnostic purposes (for example in the event of a system failure). The stored data could be loaded onto a connected computer device, or stored on a portable data stored device, and then the data loaded onto a remote computer device. Advantageously, by analysis of the stored data downtime can be minimised.

A graphics display 23 is also shown as being connected to the data processor 20, which displays operational information/values/parameters to the user, such as air flow, target airflow rate, prefilter condition status, filter condition status, temperature, run time, operational status of the extraction fan, system alarms and warnings.

An I/O interface 24 allows the apparatus to be connected to an external device by way of a USB connection.

A Comms Bus 25 allows connection to external equipment. There is also connected to the data processor 20 a real-time clock 26.

Use of the apparatus will now be described.

By way of a suitable user input device (not illustrated) a user can advantageously set a target airflow rate through the filter assembly. Over time during use, the filters progressively collect contaminants, thus progressively reduce the surface area available for air to pass through as they gradually become increasingly blocked/saturated. In order to maintain a required airflow rate, the data processor 20 is operative to compare at the sensed flow rate with the target flow rate, and where the sensed flow rate is lower than the target flow rate, the data processor 20 is operative to output a control signal to the extraction fan motor 21 so as to increase the fan speed, and therefore increase the flow rate exciting the filter 3.

At a certain point in time, however, the filter 2 and filter 3, although not necessarily simultaneously, reach a condition where they have become saturated with contaminant to the extent that they need to be replaced. Advantageously, the signals obtained from the pressure sensors 10 11 and 12, enable the saturation levels (or put another way, remaining operational lifetime) to be monitored. Pressure signals from each sensor are caused to be stored in the memory 22. Pressure measurement samples are taken periodically (for example at the rate of two hundred per second) and then time-stamped and stored in the memory 22. The data processor 20 is configured to take averages of the stored values to determine a saturation/blockage level for each filter. In particular, the processor is arranged to calculate, for each sampling instance, the pressure difference across each filter by subtracting the pressure value at the inlet 4 from that exiting the filter 2, and to subtract the pressure of air entering the filter 3, from the measured pressure leaving the filter 3. Within the memory 22 there is stored predetermined saturation levels which correspond to when a user should be altered and take any necessary action, based on measured/calculated pressure differences. For example, the user may be alerted, via the display 23, when a filter has reached seventy-five percent saturation, ninety-five percent saturation and one hundred percent saturation. Use of preemptive alerts ensure that the operator has a replacement filter available when the filter currently in place reaches one hundred percent saturation, thus, importantly, minimising downtime. Such status outputs are filter specific and so the user knows the filter status in respect of each filter.

Figure 3:
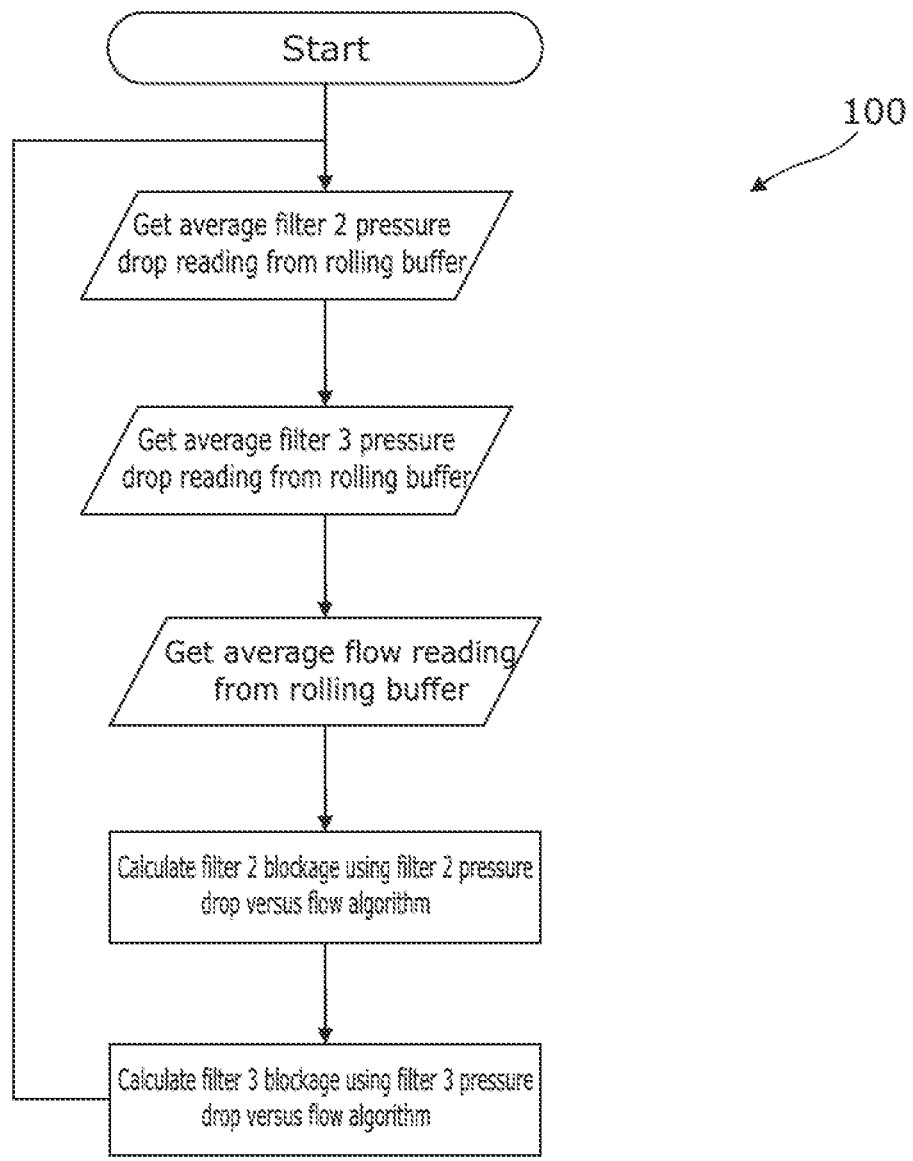
FIG. 3 is a flow diagram.

The process of determining saturation levels executed by the data processor 20 is shown in the flow diagram 100 in FIG. 3.

Highly advantageously, the above apparatus allows an accurate determination of the saturation level of each filter, and prompts the user to take the necessary action to ensure that a replacement filter is timely installed. The apparatus also monitors and controls air flow rate through the filters. Further advantageously, the information displayed to the user is both clear and significantly facilitates operation of a filter assembly of a fume extraction system. Further, the apparatus is straightforward to use.

In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:

1. A fume extraction apparatus, comprising:
    a pressure sensor assembly, the pressure sensor assembly configured for sensing fluid pressure at an outlet to a downstream filter, fluid pressure from an inlet to an upstream filter, and fluid pressure from fluid flowing from an outlet of the upstream filter to the inlet of the downstream filter; and
    a memory configured for storing multiple predetermined saturation levels for each filter, with different saturation levels indicative of different extents of saturation of each filter from the fluid pressure values;
    a data processor to process fluid pressure difference values between the respective inlet and outlet of each filter, the data processor arranged (i) to calculate average fluid pressure values from the pressure sensor assembly and thereby determine a saturation level of each filter, and (ii) to determine when a determined saturation reaches a predetermined saturation level and to thereupon cause a pre-emptive alert signal to be generated.

2. The fume extraction apparatus according to claim 1, wherein the data processor is configured to use a respective pressure difference value to determine a filter condition status for each filter.

3. The fume extraction apparatus according to claim 2, wherein the filter condition status is indicative of the extent of saturation of the respective filter.

4. The fume extraction apparatus according to claim 1, wherein the pressure sensor assembly comprises a conduit to fluidically connect a region of fluid pressure to be measured to a respective pressure sensor.

5. The fume extraction apparatus according to claim 1, comprising a flow measurement device for measuring fluid flow rate exiting the filter assembly.

6. The fume extraction apparatus according to claim 5, wherein the fluid flow rate is measured at the fluid outlet of the downstream filter.

7. The fume extraction apparatus according to claim 5, wherein the fluid flow rate is measured downstream of the fluid outlet of the downstream filter.

8. The fume extraction apparatus according to claim 5, wherein the measure of said fluid flow rate is obtained using a pitot tube device and a pressure sensor.

9. The fume extraction apparatus according to claim 1, wherein the data processor issues a control signal to an extraction fan of the filter assembly in response to the measure of the fluid flow rate exiting the filter assembly so as to substantially maintain a required/target flow rate.

10. The fume extraction apparatus according to claim 9, wherein the control signal causes control of the speed of the extraction fan.

11. The fume extraction apparatus according to claim 1, comprising a user interface having a display to allow the user to view operational data derived from the pressure sensor assembly and/or the flow measurement device.

12. The fume extraction apparatus according to claim 11, wherein the user interface comprises a user input which allows a user to set a required fluid flow rate.

* * * * *